Nov. 7, 1967 W. J. LYTLE 3,351,931

VOLTAGE ANALOG TO TIME ANALOG CONVERTER

Filed Oct. 4, 1965 2 Sheets-Sheet 1

WITNESSES
Theodore F. Wrobel
James F. Young

INVENTOR
Walter J. Lytle
BY John L. Miegroffe
ATTORNEY

United States Patent Office 3,351,931
Patented Nov. 7, 1967

3,351,931

VOLTAGE ANALOG TO TIME ANALOG CONVERTER

Walter J. Lytle, Catonsville, Md., assignor to Westinghouse Electric Corporation, East Pittsburgh, Pa., a corporation of Pennsylvania Filed Oct. 4, 1963, Ser. No. 313,835
7 Claims. (Cl. 340—347)

This invention relates to a novel voltage analog to time analog converter.

It is often desirable to modulate a carrier wave in accordance with a varying analog control voltage. It is usual to provide means for directly and continuously varying the amplitude of the wave or frequency of the carrier wave. It is also desirable in many instances to use pulse code modulation. To convert a varying modulating voltage to pulse code modulation necessitates complex equipment. The present invention provides simple means for converting directly from voltage analog to time analog modulation wherein the pulse width is a function of the instantaneous amplitude of the varying analog voltage.

Accordingly, it is an object of the present invention to provide a novel analog voltage to time analog converter which will be simple, have a high degree of accuracy, and will be capable of very high speed operation.

The present invention is an outgrowth of the development of a sampling technique in an analog to digital converter. It is conventional in analog to digital converters to use as a reference or comparison voltage a fixed voltage or one that varies periodically. This is to be contrasted with an analog to digital converter system described and claimed in a copending application Ser. No. 317,867 for Analog to Digital Converter filed Oct. 15, 1963, in the name of John M. Bentley, W. J. Lytle and C. P. Holt, Jr. and assigned to the assignee of this application. That application describes and claims a novel system which stems from the present invention in which a binary counter is used to develop an analog ramp function reference voltage through a conventional electrical (ladder) network, the ramp function reference voltage being used directly to sample the unknown input analog through an electronic switch having a fast breakover point with a positive resistance characteristic on one side of the breakover point and a negative resistance on the other side of the breakover point. Because of the nature of the development of the ramp function voltage, a digital representation of the analog may be provided from which an analog voltage output could be derived or, alternatively, a system can be provided for providing a time analog output of the instantaneous analog voltage input. This is because the reference voltage varies from a fixed reference level to the sampling level at a fixed rate.

The system of the present invention can be instrumented as a single channel system or, alternatively, it can be instrumented as a multi-channel system in which certain of the components are time shared in order to reduce the number of components where it is desired to monitor a plurality of time function analogues, such as temperatures, speed, direction, altitude and so forth. Therefore, it is another object to provide a novel voltage analog to time analog converter which is adapted to single or multiple channel operation and which will at the same time be simple, have a high degree of accuracy and be capable of very high speed operation.

The invention itself however both as to its organization and method of operations, as well as additional objects and advantages, will be best understood from the following description when read in connection with the accompanying drawing, in which.

Figure 3:
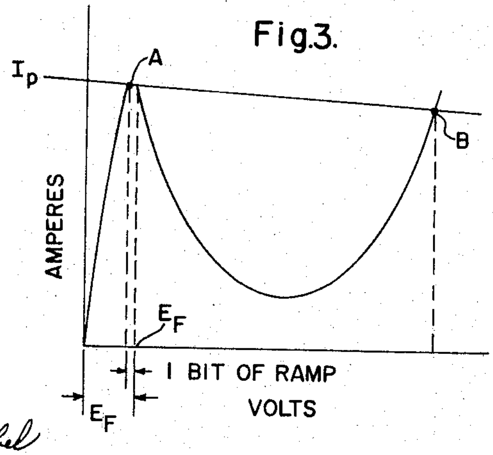
FIG. 3 is a graph illustrating the adaptation of a tunnel diode to the voltage analog to time analog converter in accordance with the present invention.

In summary, the present invention provides an electronic switch, such as a tunnel diode which has a positive resistance characteristic on one side of a sharp breakover point and a differential negative resistance characteristic on the other side of the breakover point, as illustrated in FIG. 3 or its practical electrical equivalent, through which a varying reference voltage is compared with an unknown analog input voltage $E_x$ for the purpose of sampling the latter. The varying reference voltage varies from a selected lower value to a value at least as great as the maximum value of the unknown voltage to be sampled, and its maximum value is so related to the breakover point of the electronic switch that it is just below the breakover point. Also the bias for the electronic switch is so adjusted that the maximum value of the unknown voltage is just below the breakover point of the electronic switch. Accordingly, neither the unknown analog input voltage $E_x$ nor the varying reference voltage is sufficient to cause the electronic switch to fire. The electronic switch constitutes a summing device so that it is responsive to the algebraic sum of the unknown input analog voltage $E_x$ and the varying ramp function reference voltage. In order for the electronic switch to serve as a device to develop the algebraic sum, the unknown input voltage, $E_x$, from the transducer is chosen to be of a polarity opposite to that of the ramp function reference voltage. In the embodiments illustrated the ramp function reference voltage is selected as being positive-going while the unknown analog input voltage $E_x$ is negative-going, but if desired, the reverse condition could be used. The significant factor is that the generated ramp function reference voltage be of polarity opposite to that of the input signal $E_x$. When the switch provides an output pulse it is fed through a differential amplifier to a flipflop of conventional construction which is triggered by the output pulse and is reset by the end of the ramp which resetting, for reasons hereinafter described occurs periodically. As the description proceeds it will be seen that the present converter puts out a series of pulses which are initiated in an aperiodic manner as a function of the amplitude of the input analog $E_x$ and are stopped periodically, the time interval between the starting and stopping of the pulse being a time analog of the instantaneous amplitude of the analog input $E_x$.

Figure 1:
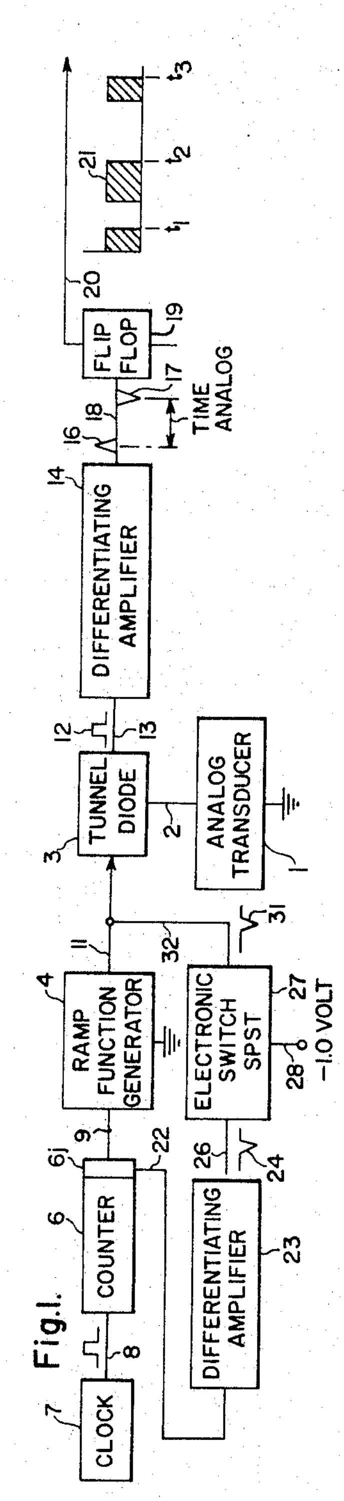
FIG. 1 is a block circuit diagram of a single channel voltage analog to time analog converter in connection with the present invention.

Referring to FIG. 1, a single channel system in accordance with the present invention comprises an analog transducer 1 providing an analog input voltage $E_x$ on connection 2, which voltage is sampled and compared in an electronic switch 3, such as a tunnel diode, having the special characteristics illustrated in the graph in FIG. 3 with a ramp function reference voltage generated by a ladder network ramp function generator 4. The electronic switch 3 is of the type which has a positive resistance characteristic on one side of a sharp breakover point and a negative resistance characteristic on the other side of the breakover point. The device should be properly loaded so that it may operate in the bi-stable mode.

"Parent," as used herein, refers to that side of the counter stages, and their digits, or states, that represent directly the absolute value of the binary count in the counter. "Complement" as used herein refers to the other sides, digits, or states of the respective stages of the counter.

The ramp function generator 4 is an electrical summation network of conventional construction, the energization of which is controlled by the parent output of the respective stages of a counter 6, also of well known construction. A suitable clock pulse generator 7 supplies clock pulses over connection 8 to the counter 6 which operates as a cyclic ring counter in response to the continuous supply of clock pulses from the generator 7. The parent outputs from the respective stages of the counter 6 are supplied over respective connections, collectively indicated by the connection 9, to the respective elements of the summation network of the ramp generator 4.

Sampling of the unknown input analog voltage, $E_x$ from the analog transducer 1 is effected through the electronic switch 3 to which the output of the ramp function generator 4 is supplied over connection 11. The electronic switch 3, which as previously mentioned, is preferably a tunnel diode and is responsive to the algebraic sum of the voltage on connection 11 and connection 2.

Figure 2:
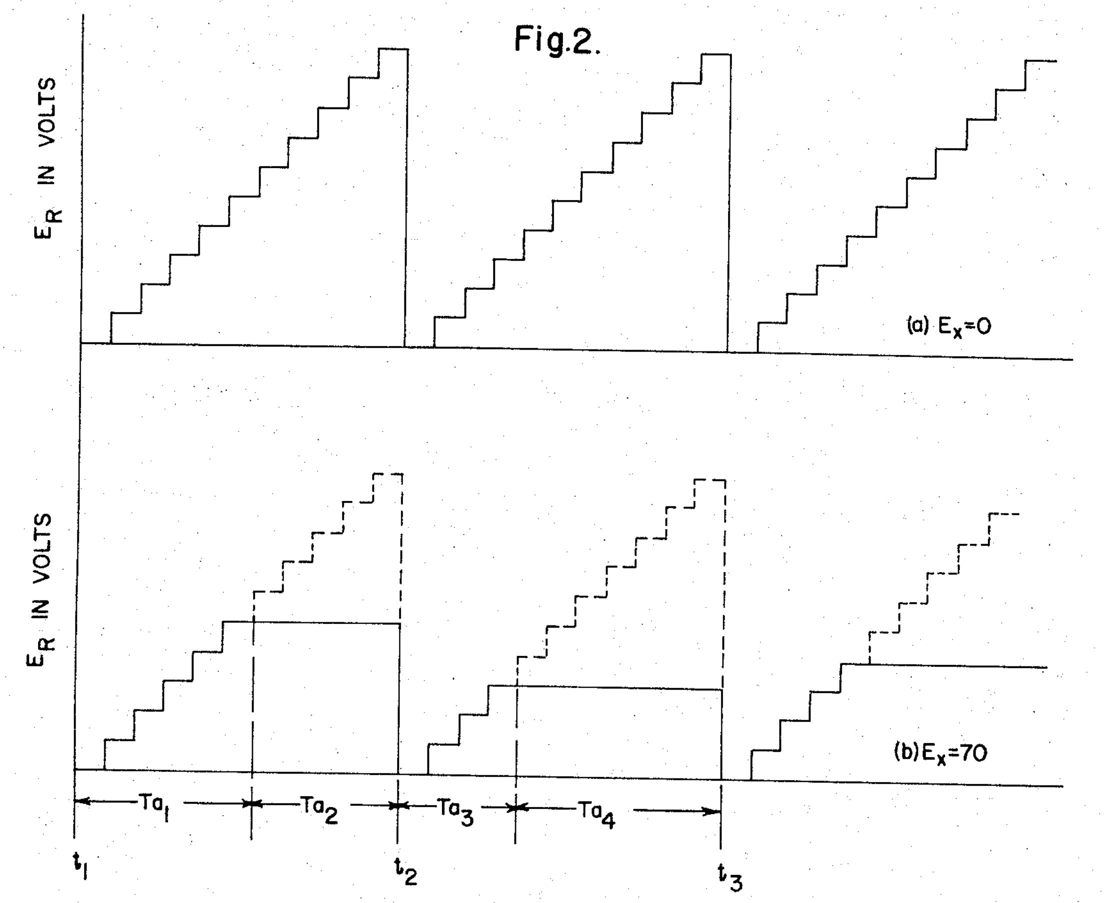
FIG. 2 shows graphs helpful in understanding the present invention illustrating the digitized ramp functions generated by the binary digital counter.

All values of $E_x$ greater than zero, within the accuracy of the device, will produce a positive pulse such as 12, on the connection 13. The pulse 12 is differentiated and amplified in the differentiating amplifier 14 and the front and rear edges of this pulse will appear as a positive pulse 16 and a negative pulse 17, respectively. The pulses 16 and 17 are supplied over connection 18 to a flipflop 19, the parent and complement sides of which produce width-modulated pulses indicated at 21. The points $t_1$, $t_2$, and $t_3$, of FIG. 1 and FIG. 2 represent periodically spaced zero time reference points which correspond to the periodic instants of starting of the ramp function. As will be clearer from subsequent description the time intervals $Ta_2$ and $Ta_4$ are measured from these zero time reference points $t_1$, $t_2$ and $t_3$ and represent the time analog of the instantaneous value of the analog input voltage $E_x$. The respective complements of these time analogs are $Ta_1$ and $Ta_3$. If desired, the outputs of the complement sides of the stages could be utilized to provide a digital representation of $E_x$ or by energizing an appropriate complement ladder network (not shown) could be utilized to derive a voltage analog of $E_x$.

It was previously explained that the electronic switch 3 is of a type which has a positive resistance characteristic on one side of a sharp breakover point and a negative resistance characteristic on the other side of the breakover point. The well known tunnel diode is an example of such a device which has two stable states, one on each side of the breakover or "firing" point.

From this it will be readily apparent that if during the sampling process the electronic switch or tunnel diode 3 is driven to one stable state, point B, FIG. 3, that is, across its negative region, it is necessary that means be provided for driving the device to its other stable state point A, FIG. 3, on the other side of the firing point $E_F$, to reset and condition the tunnel diode for subsequent sampling.

To this end, the parent output of the last stage $6_j$ of the counter 6 is supplied over connection 22 to a differentiating amplifier 23 which generates a negative pulse 24 on connection 26. This negative pulse 24 is supplied to an electronic switch 27 which is the electrical equivalent of a single pole, single throw mechanical switch interposed between a source of negative potential, represented by the terminal 28, and the connection 11. When the electronic switch 27 is closed a negative pulse 31 on connection 32 drives the electronic switch 3 back from the fired point B to its other stable state point A, FIG. 3 on the positive resistance side of its breakover point. Thus electronic switch 3 is reset to its stable state to again sample the analog input voltage $E_x$.

It should be said at this point that the output of the last stage $6_j$ of the counter 6 is used to energize the electronic switch 27 thru a differentiating amplifier 23 rather than using the output of the ramp function generator 4 in order not to degrade the output of the ramp function generator. It is immaterial in the operation of the device whether the electronic switch 27 is operated directly from the output of the ramp function generator 4 or from the last stage of the counter 6.

Referring to he operation of the embodiment of FIG. 1, under conditions where the unknown input analog voltage $E_x$ is equal to zero the counter 6 will operate continuously as a ring counter, i.e. the counter will recycle itself each time the count reaches the end of the counter. Under this condition the ramp generator 4 generates a series of identical stair-stepped ramps as illustrated in FIG. 2(*a*). Under conditions where the unknown input voltage $E_x$ is greater than zero, as the counter 6 counts forward in binary digits the ramp function generator 4 generates stair-stepped ramps of varying numbers of steps, as illustrated in FIG. 2(*b*), the top steps of which represents voltage and time analogs of $E_x$. The top step is determined when the output voltage of the ramp function generator 4 plus the voltage $E_x$ is one bit more than the threshold firing voltage, $E_F$, of the electronic switch 3 the firing of the latter causing it to be switched to the higher bistable state point B on FIG. 3 producing an output pulse of considerable gain relative to the analog voltage change. As has been previously mentioned, the electronic switch 3 may be a device, such as a tunnel diode, which has two positive resistance portions of its characteristic curve separated by an intermediate negative resistance portion. Also, the first positive portion of the characteristic curve is separated from the negative resistance portion of the curve by a fast breakover point. In other words, the device has two stable states, one of which is on one side of the sharp breakover point and the other is on the other side of the breakover point. When the tunnel diode 3 "fires" it presents a constant current load to the output of the ramp function generator 4. Accordingly, when the electronic switch 3 fires the ramp function generating means, which in the present instance, comprises the clock pulse generator 7, the counter 6 and the ladder summation network of the ramp function generator 4, becomes ineffective even though the clock generator continues to function and the counter continues to count. At the instant that the electronic switch 3 fires the positive pulse 12 appears on the connection 13 and it passes through the amplifier 14 where there is generated a positive pulse 16 corresponding to the aperiodic beginning of the count, followed by a negative pulse 17, that is the beginning of the ramp function and the end of the time analog both pulses appearing on connection 18.

The pulse 17 representing the beginning of the one ramp function and the end of the previous time analog sets the flipflop 19 to its set position (zero state) giving an output indication of zero, and the beginning of pulse 12, resulting from the firing of the electronic switch 3 and shown as 16, resets the flipflop 19 giving an output for marking the "one state" aperiodic beginning of the time analog which represents the instantaneous amplitude of the unknown analog input voltage $E_x$.

This is clearly illustrated in FIG. 2*b* where $E_x$ is greater than zero. It is to be noted that in the operation of this embodiment the counter 6 counts continuously as a ring type counter, even though its output is no longer effective to increase the amplitude of the ramp generator 4 after the electronic switch 3 fires. This is indicated by the dotted portion of the curve. When the electronic switch fires, that is, when it goes to its second stable state it places a constant current load on ramp function generator 4 and therefore its output remains substantially constant during the remaining counts of the counter as indicated by the solid line in FIG. 2*b*. The output pulse from the last stage, $6_j$, of the counter 6 is used to switch the diode 3 to its first stable state, point A, FIG. 3, on the opposite side of the sharp breakover point. This is accomplished by applying the output from stage $6_j$ to connection 22 to the differential amplifier 23 which puts out a negative pulse 24 on connection 26 to momentarily close the electronic switch 27, thus applying momentarily a small negative voltage to the electronic switch 27 to switch it to its first stable state, thus eliminating the load on the output of the ramp generator 4 so that its output progressively increases at the selected rate as the next stepped ramp is generated. Although the transducer has been described above as though it were an active source of voltage it is to be understood that a passive device such as a linear impedance providing a dynamic load line may be used as an alternative or in combination with an active source.

Figure 4:
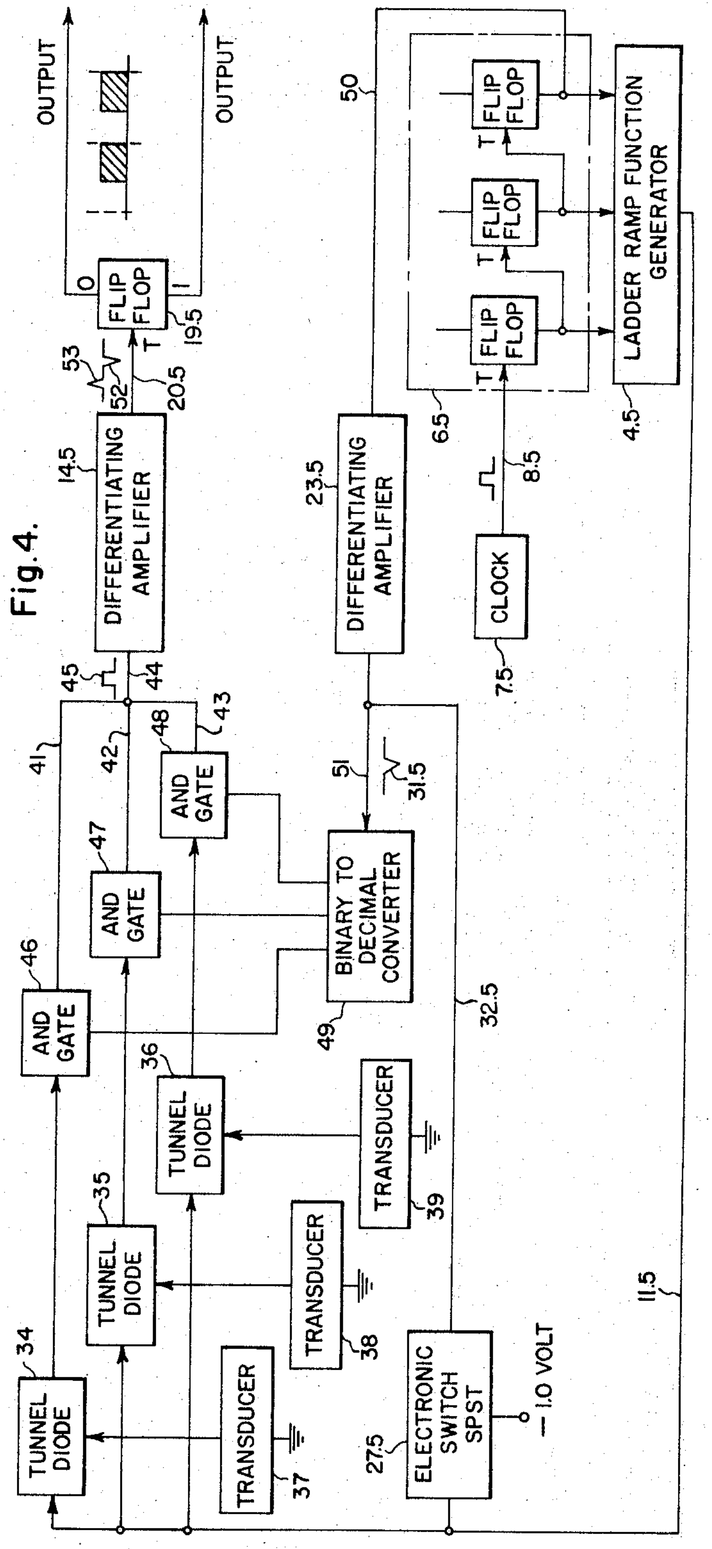
FIG. 4 is a block circuit diagram of a multi-channel voltage analog to signal analog converter in accordance with the present invention.

In a manner similar to that described in said copending application the single channel system shown in FIG. 1 may be incorporated into a multi-channel system in which the digitizing portion and the ramp function generator as well as the output circuitry can be time shared among a plurality of channels, three of which are illustrated in FIG. 4. The clock 7.5, the counter 6.5, the ladder network ramp function generator 4.5, the electronic switch 27.5, the differentiating amplifier 23.5 and the differentiating amplifier 14.5 correspond to their counterparts in FIG. 1 indicated by the reference numerals 7, 6, 4, 27, 23 and 14, respectively. It is obvious that it is necessary to have a separate electronic switch, corresponding to the electronic switch 3 of FIG. 1, for each of the individual channels. These electronic switches are indicated in FIG. 4 at 34, 35 and 36. Each of the circuits to be monitored are provided with transducers 37, 38 and 39, respectively. Since the three channels represented by the connections 41, 42 and 43, respectively, feed into a common connection 44 to the differentiating amplifier 14.5 appropriate means are necessary for connecting the respective outputs from the electronic switches 34, 35 and 36, respectively, in a sequential manner to the connection 44. To this end, suitable AND gates 46, 47 and 48 are provided for the respective channels and these AND gates are controlled by a binary to decimal converter matrix 49 in response to output pulses from a differentiating amplifier 23.5 supplied over the connection 51. The input of the amplifier 23.5 is energized from the parent side of the last stage of the counter 6.5 over connection 50. The manner of the selection of the different channels by the matrix 49 is similar to that described in the aforementioned pending application.

In the operation of this embodiment it will be apparent that clock pulses from the clock pulse generator 7.5 are supplied over the connection 8.5 to the counter 6.5 causing the latter to operate continuously as a ring counter. The individual outputs from the stages are supplied to the ramp function generator 4.5 and the output of the latter is supplied over connection 11.5 to the individual electronic switches 34, 35 and 36, respectively. After the counter has gone through a complete cycle, monitoring, successively, the analog inputs from the three transducers 37, 38 and 39, the output from the last stage of the counter 6.5 on connection 50, causes differentiating amplifier 23.5 to generate a negative going pulse 31.5 on connection 32.5 as well as on connection 51. The pulse on connection 32.5 drives the electronic switch 27.5 back to its first stable state at the same time the pulse 31.5 on connection 51 closes the appropriate AND gate for the channel just monitored and opens the successive gate to monitor the next channel in a manner well understood in the art. It will be understood of course that this operation continues in ring like fashion as each channel is repeatedly and sequentially monitored. The output from the differentiating amplifier 14.5 is supplied to the flip flop 19.5 which is set and reset by the output signals on connection 20.5.

The output on connection 20.5 will be a series of paired pulses 52 and 53 of opposite polarities corresponding, respectively, to the front edges and the rear edges of pulses 45 on connection 44. The distance between the pulses of each pair correspond to the time interval $Ta_2$ or $Ta_4$ on the graph of FIG. 2*b*, the left hand side of the pulse representing the instant at which the generated ramp function becomes equal to the instantaneous value of $E_x$ and the right hand side of the pulse representing the instant at which the last stage of the counter is set to recycle. The pulses 52 and 53, when supplied to the flip flop 19.5 cause the latter to generate a series of pulses 54 at its output terminals with terminating edges that occur periodically, their widths being modulated and representing a time analog of the instantaneous value of the signals $E_x$. It will be readily apparent that these outputs can be obtained at either the parent or complement sides of the flip flop 19.5, and will be complementary.

It will be obvious to those skilled in the art that the invention is not limited to the specific embodiments illustrated but is susceptible to various changes and modifications without departing from the spirit thereof.

I claim as my invention:

1. An analog amplitude-to-time analog converter comprising, first means including a continuously operating clock pulse generator continuously driving a cyclic counter feeding a ramp function generator for generating a series of periodic incrementally stepped simulated ramp function voltage output pulses, second means connected to said ramp function generator and having high impedance and low impedance states, said second means being responsive to the algebraic sum of an unknown analog input voltage and the voltage generated by said first means for changing its impedance from high to low impedance state and thereby generating an output signal pulse the front edge of which represents a time mark, said output signal pulse continuing until abruptly terminated by the cyclic resetting of said counter.

2. The combination as set forth in claim 1 in which said second means is an electronic switch.

3. The combination as set forth in claim 1 in which said second means is a tunnel diode.

4. The combination as set forth in claim 3 in which said third means includes a differentiating amplifier connected to the output of the last stage of said counter, a source of resetting potential and a switch responsive to the output of said amplifier for applying said resetting potential to said tunnel diode.

5. The combination as set forth in claim 1 with means responsive to the leading and trailing edges of said output pulses to generate amplified replicas of said output pulses.

6. The combination as set forth in claim 5 in which the latter means includes a differentiating amplifier for differentiating the leading and trailing edges of said output pulses and a flip-flop multivibrator for generating an amplified time analog signal.

7. The combination as set forth in claim 1 and third means for applying a resetting voltage to said second means.

References Cited

UNITED STATES PATENTS

| | | | |
|---|---|---|---|
| 3,087,150 | 4/1963 | James | 340—347 |
| 3,141,157 | 7/1964 | Raffo | 340—347 |

DARYL W. COOK, *Primary Examiner.*

MAYNARD R. WILBUR, *Examiner.*

A. L. NEWMAN, W. KOPACZ, *Assistant Examiners.*